United States Patent

Davis

[15] 3,696,164
[45] Oct. 3, 1972

[54] MOLECULAR SIEVE 13-X CATALYZED ISOMERIZATION OF ALPHA-PINENE-IMPROVEMENT OF CATALYST ACTIVITY

[72] Inventor: Curry Beach Davis, Panama City, Fla. 32401

[73] Assignee: Arizona Chemical Company, New York, N.Y.

[22] Filed: June 1, 1971

[21] Appl. No.: 148,898

Related U.S. Application Data

[63] Continuation-in-part of Ser. No. 845,431, July 28, 1969, abandoned.

[52] U.S. Cl. ........260/675.5, 208/DIG. 2, 252/455 Z, 260/666 A
[51] Int. Cl. ........C07c 13/00, C09f 3/02, C01b 33/28
[58] Field of Search....................................260/675.5

[56] References Cited

UNITED STATES PATENTS

| | | |
|---|---|---|
| 2,382,641 | 8/1945 | Kharasch et al. ........260/675.5 |
| 2,882,244 | 4/1959 | Milton......................252/455 |
| 3,270,075 | 8/1966 | Derfer et al. ............260/675.5 |
| 3,377,400 | 4/1968 | Wise..........................260/668 |
| 3,642,928 | 2/1972 | Davis......................260/675.5 |
| 3,655,803 | 4/1972 | Miller......................260/675.5 |

*Primary Examiner*—Delbert E. Gantz
*Assistant Examiner*—G. E. Schmitkons
*Attorney*—James H. Laughlin, Jr.

[57] ABSTRACT

A method for producing dipentene is given whereby a terpene containing feed is isomerized at a temperature of between 140° and 200° C. in the presence of an alkali metal containing aluminosilicate catalysts of the 13X-type which has been activated by water extraction.

5 Claims, 6 Drawing Figures

INVENTOR.
CURRY BEACH DAVIS

MOLECULAR SIEVE 13-X CATALYZED ISOMERIZATION OF ALPHA-PINENE-IMPROVEMENT OF CATALYST ACTIVITY

This application is a continuation-in-part of application Ser. No. 845,431, filed July 28, 1969, now abandoned.

This invention relates to an improved process for the isomerization of terpenes generally and in particular, turpentine, α-pinene, and β-pinene. More particularly, it relates to the production of dipentene by isomerization of terpene containing feed by means of heating in the presence of a prepared selective catalyst.

Dipentene is an important article of commerce and is in great demand for the production of terpene resins which are used in hot melt coatings, adhesives, and the like. The prior art shows many examples of isomerizing α-pinene. For example U.S. Pat. No. 2,382,641 issued to Kharasch and Reynold teaches the conversion of optically active α-pinene to limonene which is the optically active form of dipentene. According to the patent this is accomplished by heating with organic acids, such as benzoylbenzoic or salicyclic acids, in the presence of organic acid amides, such as formamide or acetoamide, at temperatures of 140° to 200° C. for 15 to 50 hours. The process of the present invention is advantageous in that the employment of expensive organic acids and amides is avoided and isomerization is effected in a few hours resulting in excellent yields.

Frilette and Weiss U.S. Pat. No. 3,143,222, teach the use of an activated 10X zeolite to reduce polymer formation in the isomerization of α-pinene which under their conditions has been found to yield predominant yields of camphene. In discussing the activity of 13X molecular sieves in the Journal of Physical Chemistry, Vol. 64, page 382, Weiss and Frilette state that "α-pinene undergoes no reaction when refluxed with the Na$^+$ form [13X zeolite], but is converted extensively to camphene by the Ca$^{++}$ salt [10X zeolite]".

U.S. Pat. No. 3,270,075 issued to Derfer and Bordenca teaches the isomerization of α-pinene to a dipentene-rich isomerizate with a 10X or 13X zeolite at temperatures in the range of from about 65° to about 100° C. This patent specifically teaches, however, that the use of higher temperatures is detrimental to the production of dipentene. For example, at Column 8, lines 24 and following, it is stated that when temperatures of about 135° to 154° C. are employed, considerably more camphene is produced and in most instances camphene becomes the predominant product. Furthermore, in Example 1, at Column 6, line 20, it is stated that when α-pinene is treated at 150° C. with a 13X molecular sieve catalyst, the isomerizate is found to contain only 10% of the desired dipentene product.

It is an object of this invention to provide a simple process for producing high yields of dipentene in an economic manner. A further object is to provide a process for producing dipentene wherein the amounts of undesirable by-products are minimized. These and other objects of the present invention will become apparent from the full reading of the ensuing specification and examples.

In copending application Ser. No. 130,120, filed Apr. 1, 1971 (Case No. 24,083) which was a continuation-in-part of application Ser. No. 845,432, filed July 28, 1969, it is shown that dipentene may be produced in satisfactory amounts by employing an isomerization reaction in the presence of an isomerization catalyst at high temperatures. It has now been unexpectedly found that high yields of dipentene can be obtained by isomerizing a terpene containing feed at high temperatures using a selective and improved alkali metal-containing alumino-silicate catalyst of the 13X type. This finding is particularly surprising since high yields of dipentene may be produced when employing very low amounts of catalyst. Furthermore, only minor amounts of by-products such as camphene are found.

In accordance with this invention a terpene or pinene containing feed which may include α-pinene, β-pinene, or turpentine is isomerized in the presence of less than about 10 percent of a prepared zeolite catalyst of the 13X type.

Zeolite X can be represented in terms of mole ratios of oxide as follows:

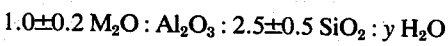

wherein M is an alkali metal and $y$ is a value from 0 to 8 depending on the identity of the alkali metal and the degree of hydration in the crystal. The sodium form for example may be represented as follows:

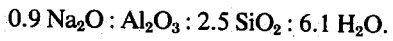

Typically the anhydrous synthetic sodium zeolite of the X-type has a composition of $Na_{86}(AlOhd 2)_{86}(SiO_2)_{106}$ and an effective pore diameter of about 13 Angstroms. The crystal structures are such that they have a large number of pores characterized by exceptionally uniform size. As sold commercially, these catalysts are in aqueous slurry or substantially dehydrated form normally having a water content of about 1%. In my invention it is surprising that only the sodium zeolite may be employed and that the potassium and lithium sieves which have similar structures and characteristics may not be used. The alkali metal aluminosilicates employed in the present invention are further described in a number of U.S. Patents, including Nos. 2,882,244 and 3,140,249.

Surprisingly, it has been found that by pretreating the catalyst prior to the isomerization reaction an unexpectedly high yield of product is obtained. Moreover, by pretreating the catalyst, its activity can be substantially enhanced and improved process characteristics result. It has been unexpectedly found that the sodium-containing aluminosilicate catalyst may be effectively pretreated by extracting the same with water to enhance its activity. By water extraction, it is meant that the catalyst is mixed with large volumes of water and washed. It has been found that be mixing the catalyst with a relatively high volume of water as compared with slurrying wherein small volumes of water are used, that is, from about more than one to about fifteen times the volume of water based upon the catalyst mixed therein and preferably from about two to about ten times, the catalyst may be substantially activated. Typically, the molecular sieve catalysts employed in this invention are washed or admixed from at least 1 to about 10 times with large volumes of water which are usually greater than an equal volume percent of catalyst and preferably from about 2 to 10 times the volume of catalyst being activated.

While I do not wish to be bound to any theoretical considerations, it is my belief that the presence of free sodium metal cations hinders the isomerization reaction. By washing the catalyst certain sodium metal cations which are loosely attached or present on the surfaces of the catalyst are removed thus bringing the surface of the catalyst into substantial equilibrium with the effluent wash water. The removal of these available alkali metal cations reduces the potential ion hinderence to the isomerization reaction.

The wet catalysts can be dried at temperatures of about 150° to about 600° C. but preferably about 300° C., so as to obtain a catalyst having a water content of about 2 to about 6% and preferably 4% for use in the process of the present invention.

It has surprisingly been found that when small amounts of the prepared catalysts are used in the high temperature isomerization reaction, an unexpected high amount of dipentene can be produced. In fact, I have found that dipentene can be produced in predominant amounts while by-products and undesirable reaction products which are usually formed in isomerizations of this type can be minimized and in some cases completely avoided.

In one embodiment of this invention, a pinene is heated at reflux with less than about 10% based upon the weight of the feed of a pretreated activated 13X molecular sieve zeolite catalyst which had been washed 3 times with fresh effluents of water equaling 10 times the catalyst volume and then subsequently dried at a temperature of 300° C. until a moisture content of about 4% was obtained. The isomerization reaction may proceed for any desired length of time but it is usually limited to from about 1 to 15 hours. The resulting isomerizate is then filtered to remove the molecular sieves which are then recycled and the isomerizate is fractionated to separate the desired dipentene from other undesirable products.

The isomerization process of the present invention is generally carried out at temperatures of from about 140° C. to about 200° C. Preferred reaction temperatures are in the range of 150° to about 175° C. In general, reaction times are from about 0.5 to 15 hours. Preferable reaction times are from 2 to 4 hours. The catalyst employed is an activated sodium X-type sieve of the 13X-type which has been activated as discussed above. The amount of catalyst employed may be from about 0.1 to about 5% based upon the weight of the feed for normal operations. However, I have found that dipentene may be efficiently produced by employing from about 0.1 to about 2% catalyst. The process may be carried out either batch-wise or continuously, and under autogeneous, elevated or reduced pressures.

The invention may be further understood by reference to the figures, in which

Figure 1:
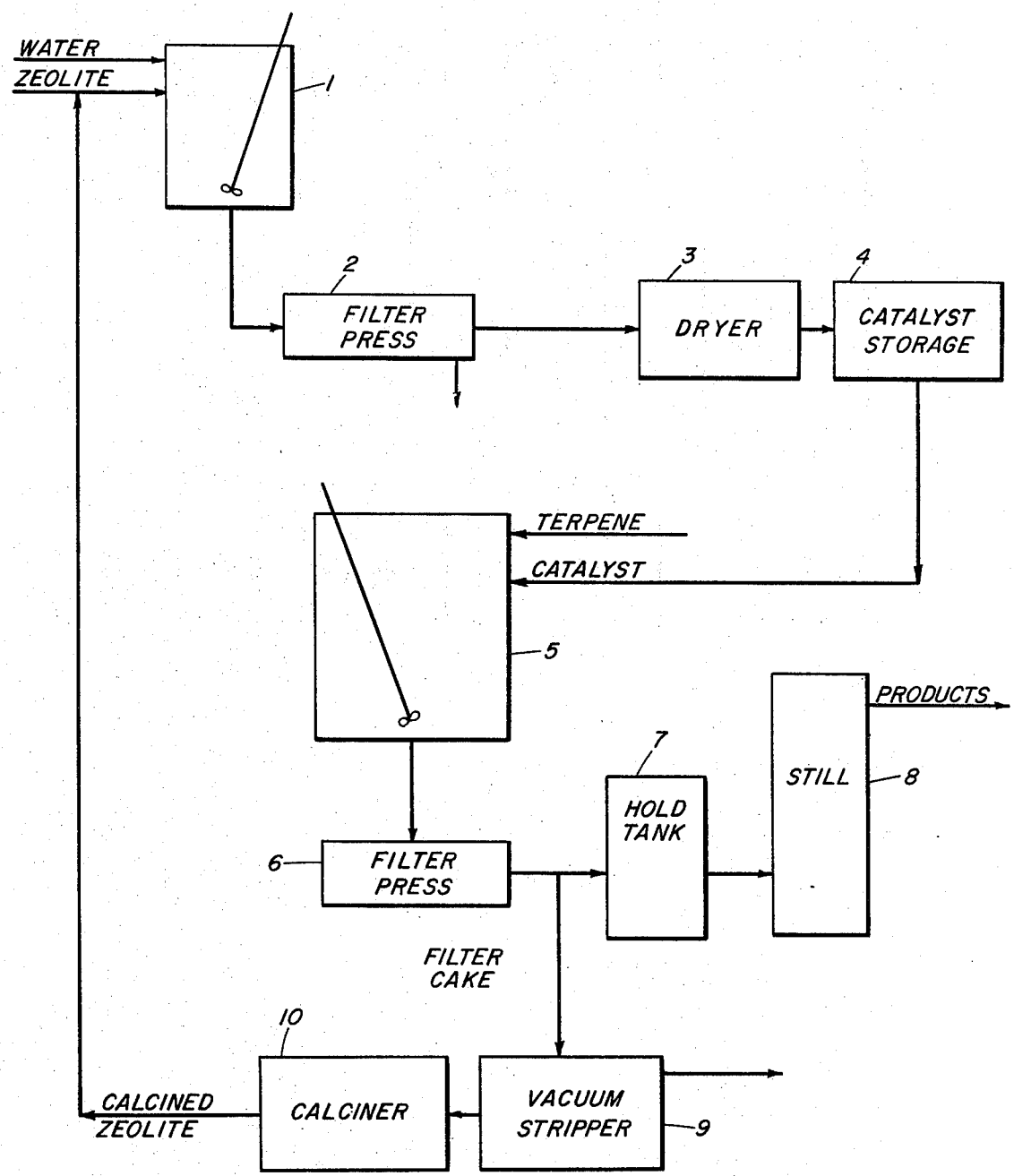
FIG. 1 is a flow diagram of the process.

As shown in FIG. 1, the zeolite catalyst is given a pretreatment by extraction with water in mixer 1, filtered in filter press 2, dried in dryer 3 and stored at 4.

The pretreated catalyst and terpene feed are fed to the reactor 5 where the reaction takes place under the conditions previously recited, after which the catalyst and product mixture is separated in filter press 6. The catalyst goes to a vacuum stripper 9 for removal of any remaining product and then to calciner 10 to be heated and recycled to the process.

The isomerized product from filter press 6 containing predominately dipentene but also minor amounts of terpinolene and camphene is recycled through a holding tank 7 which also receives the effluent from stripper 9. The combined product from tank 7 is then distilled to separate the various fractional products.

The following examples further illustrate the present invention and are not intended to limit the scope thereof in any manner. Reference numerals in the examples refer to FIG. 1. Examples 1 to 5 disclose the results obtained with a slurried catalyst. Example 6 shows the results obtained with an extracted catalyst. All parts are by weight unless otherwise stated.

EXAMPLE 1

500 pounds of 13X molecular sieves (Linde Division of Union Carbide Corporation) was charged to kettle 1 containing 200 gallons dionized water. The mixture was then slurried for 30 minutes and filtered through filter press 2, the effluent being sewered. The filter cake was transferred to drier 3 where it was dried 16 hours at 300° C. prior to transfer to catalyst storage 4.

EXAMPLE 2

Kettle 5 was purged with inert gas, preferably nitrogen, prior to charging 3,900 pounds of α-pinene. 39 pounds of the catalyst of Example 1 was then added while agitating at 250 rpm. The port was then closed, and the temperature was raised rapidly. The mixture began to reflux at 162° C. and, within 5 hours, had reached 172.5° C. Full cooling water was then turned on. The cooled mixture was pumped through filter press 6, with the isomerizate going to holding tank 7 and the filter cake to vacuum stripper 9. The dried filter cake was transferred to calciner 10 where it was calcined 1 hour at 600° C. before being returned to storage.

The isomerizate, on fractionation in still 8 yielded 2,254 pounds dipentene, 407 pounds terpinolene, 625 pounds camphene, 175.5 pounds unreacted α-pinene, and 358 pounds other terpenes.

EXAMPLE 3

The procedure of Example 2 was repeated in every detail except that β-pinene was used as the feedstock.

The isomerizate, on fractionation, yielded 2,106 pounds dipentene, 443 pounds terpinolene, 371 pounds α-pinene, 404 pounds camphene, and 240 pounds other terpenes.

EXAMPLE 4

The procedure of Example 2 was followed in every detail, except that sulfate terpentine was used as the feedstock.

The isomerizate, on fractionation, yielded 2.067 pounds dipentene, 710 pounds camphene, 472 pounds terpinolene, 421 pounds α-pinene, 31 pounds β-pinene and 140 pounds other terpenes.

EXAMPLE 5

To determine the influence of the temperature at which the catalyst was dried and, indirectly, of moisture content on the rate of the isomerization reaction, the following series of experiments was carried out.

Hydrated 13X catalyst was dried at various temperatures ranging from ambient temperature to 600° C., and the dried catalyst thus obtained was evaluated with regard to its activity towards α-pinene in the following manner.

2.0 g. of catalyst was contacted with 100 g. of α-pinene, and the resulting mixture was heated isothermally under nitrogen at 160° C. This amounts to 2% catalyst based on the α-pinene. Samples were withdrawn periodically and analyzed. The data obtained is illustrated in Table I.

TABLE II

| Figure | Number of Extractions | Reaction Time[1] | Max. Yield of dipentene |
|---|---|---|---|
| 3 | None | 4.0 hrs. | 65% – 6.0 hrs. |
| 4 | 1 | 1.8 hrs. | 63% – 2.5 hrs. |
| 5 | 3 | 1.1 hrs. | 63% – 1.5 hrs. |
| 6 | 6 | 0.6 hrs. | 59% – 0.7 hrs. |

[1] Reaction time to 10% α-pinene in isomerizate

Using the optimum drying temperature for the catalyst, as shown in Example 5, of 325° C., the catalyst was extracted a variable number of times before drying. The effect of multiple extractions is shown in Table II and FIGS. 3 to 6. FIGS. 3 to 6 correspond to the

TABLE I
Effect of $H_2O$ concentration on reactivity of molecular sieve 13X during isomerization of α-pinene

| Catalyst source | Catalyst conc., percent | Water content of catalyst (percent) | Reaction temp., °C. | Time (min.) attain reaction temp. | 1 hr. | 1½ hrs. | 2 hrs. | 2½ hrs. | 3 hrs. | 3½ hrs. | 4 hrs. | 4½ hrs. | 5 hrs. | 5½ hrs. | 6 hrs. | Percent yield of products based on pinene consumed at maximum indicated conversion. |
|---|---|---|---|---|---|---|---|---|---|---|---|---|---|---|---|---|
| A | 2 | 28.0 | 160 | 120 | 30.0 | | 38.7 | | 45.6 | | 49.3 | | 51.4 | | | Dipentene, 67.8; camphene, 18.4; terpinolene, 8.9. |
| B | 2 | 10.5 | 160 | 60 | 41.2 | | 52.6 | | 61.3 | | 68.8 | | 73.3 | | | Dipentene, 66.6; camphene, 18.2; terpinolene, 9.4. |
| C | 2 | 9.4 | 160 | 30 | 55.9 | | 71.2 | | 80.4 | | 86.7 | | 90.7 | | 94.2 | Dipentene, 63.2; camphene, 17.6; terpinolene, 11.0. |
| D | 2 | 5.3 | 160 | 13 | 75.3 | | 87.8 | 91.6 | 94.2 | | | | | | | Dipentene, 62.2; camphene, 18.0; terpinolene, 11.4. |
| E | 2 | 4.3 | 160 | 12 | 86.6 | 91.8 | 94.8 | | | | | | | | | Dipentene, 63.8; camphene, 18.3; terpinolene, 11.1. |
| F | 2 | 4.5 | 160 | 12 | 53.5 | | 71.6 | | 80.8 | | 87.4 | | 92.7 | | 94.8 | Dipentene, 64.0; camphene, 17.5; terpinolene, 10.8. |

A = Catalyst slurry air dried at ambient temperature.
B = A (above) dried at 150° C.
C = A (above) dried at 200° C.
D = A (above) dried at 250° C.
E = A (above) dried at 300° C.
F = A (above) dried at 600° C.

Figure 2:
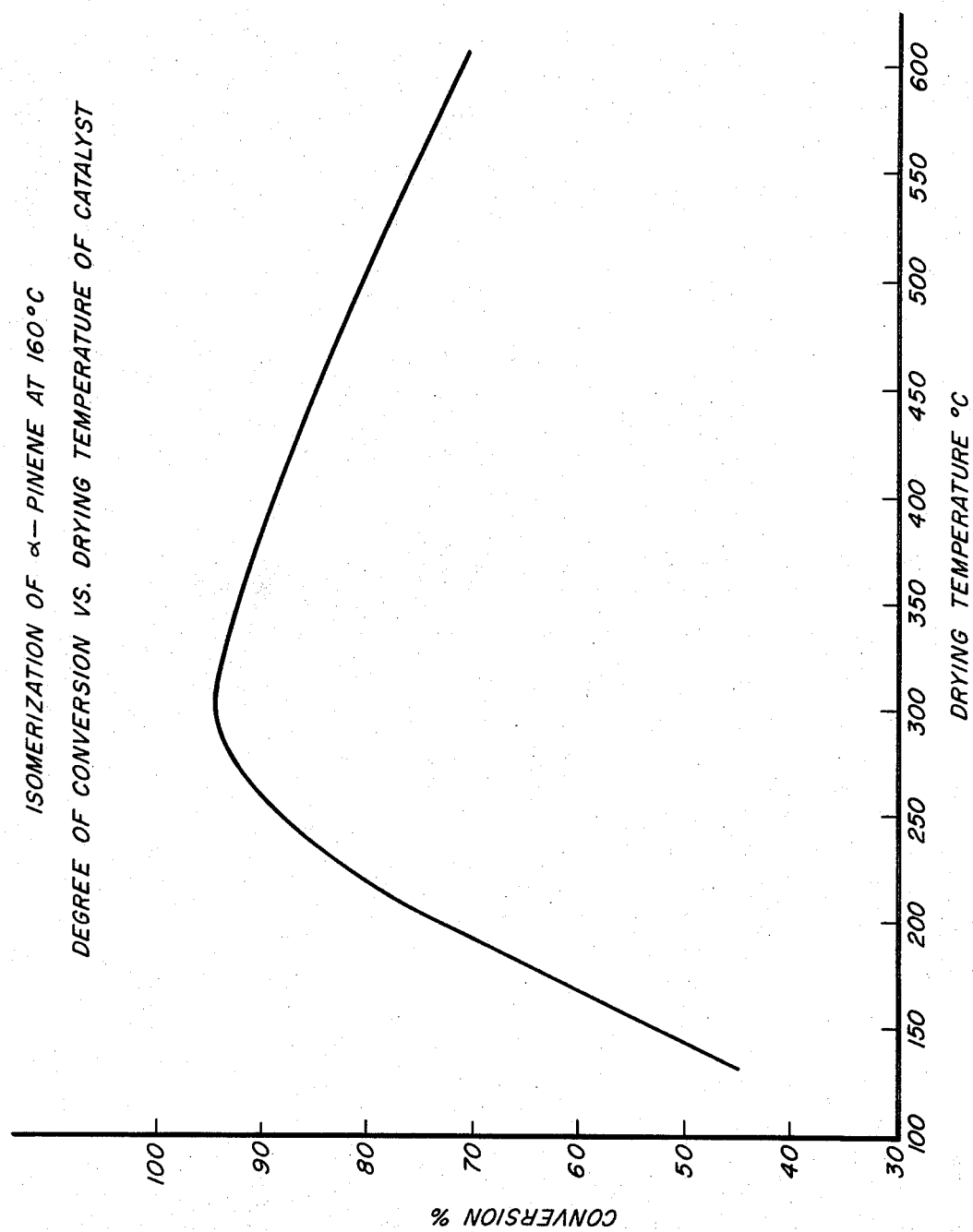
FIG. 2 shows the reaction conversion in comparison to the drying temperature of the catalyst.
Figure 3:
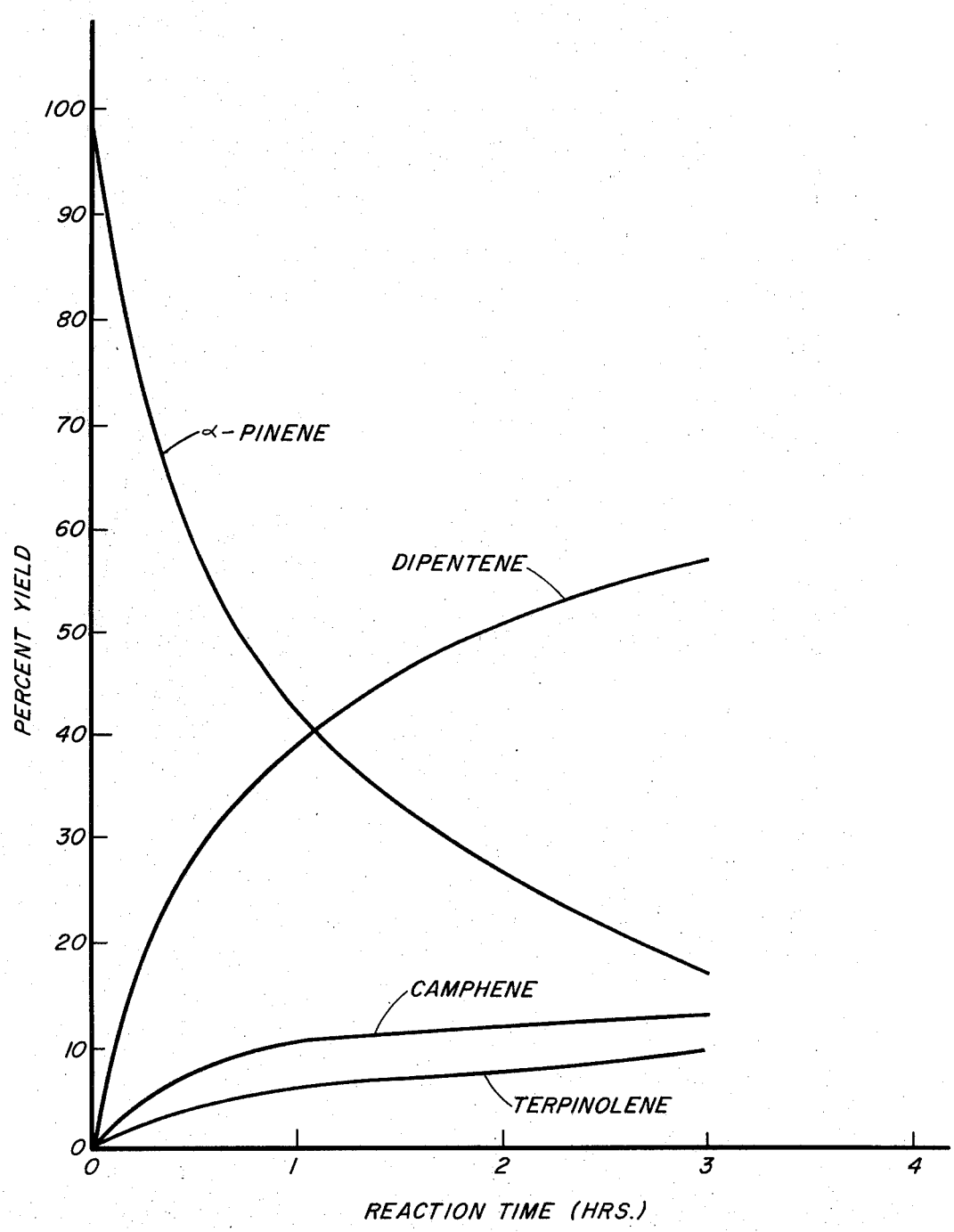
FIGS. 3 to 6 show product constituents without a pretreatment of catalyst and with varying amounts of moisture on the pretreated catalyst.
Figure 4:
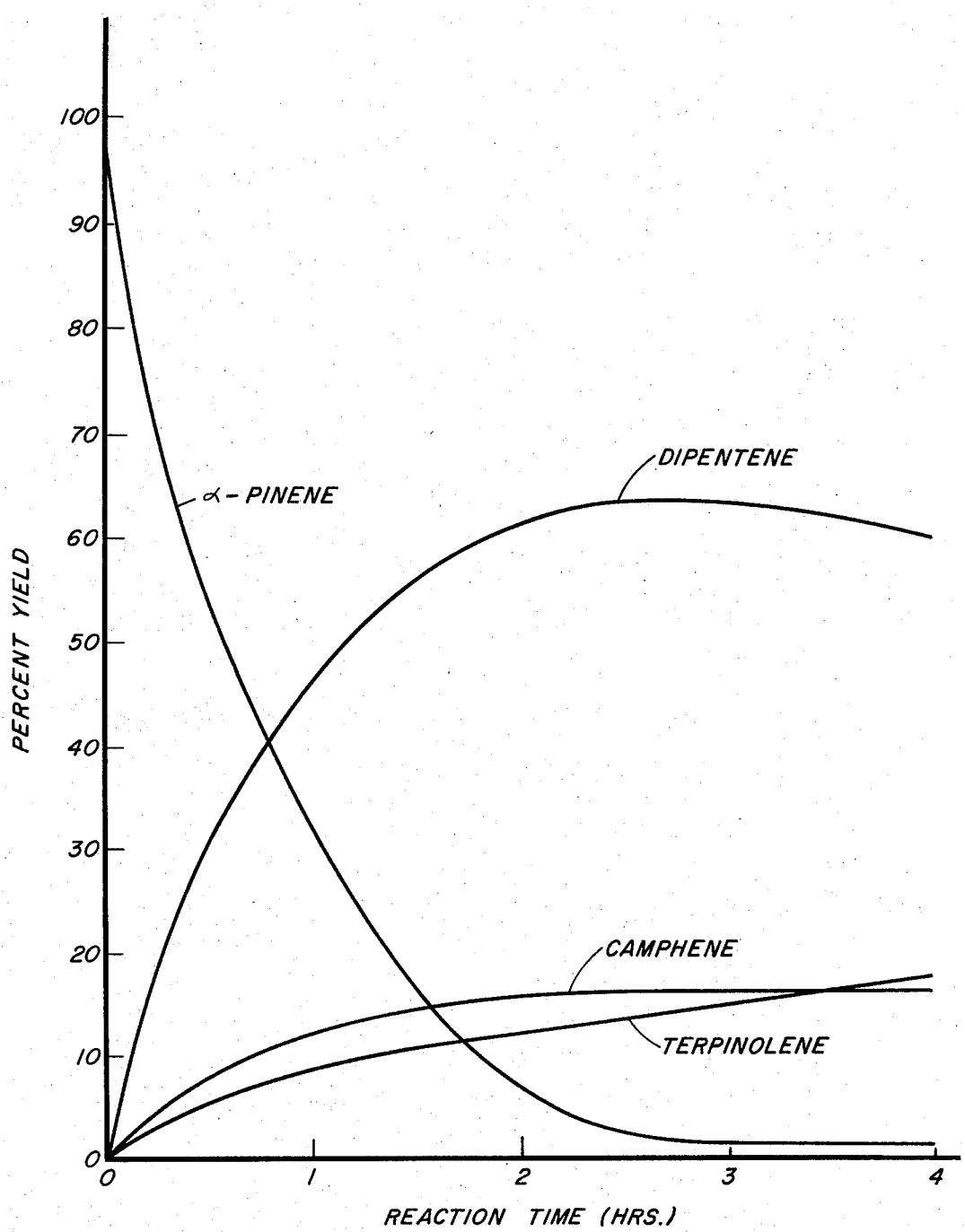
Figure 5:
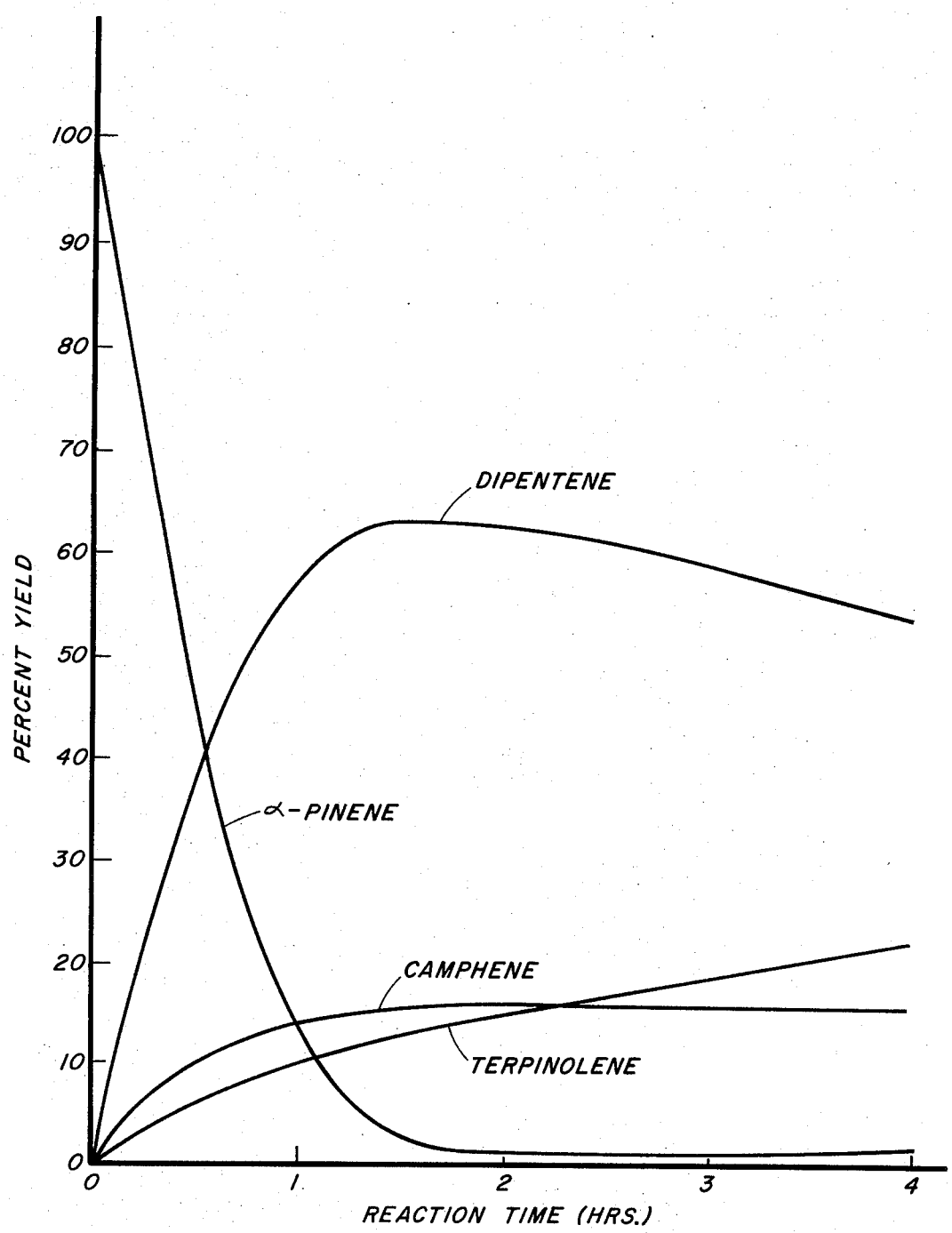
Figure 6:
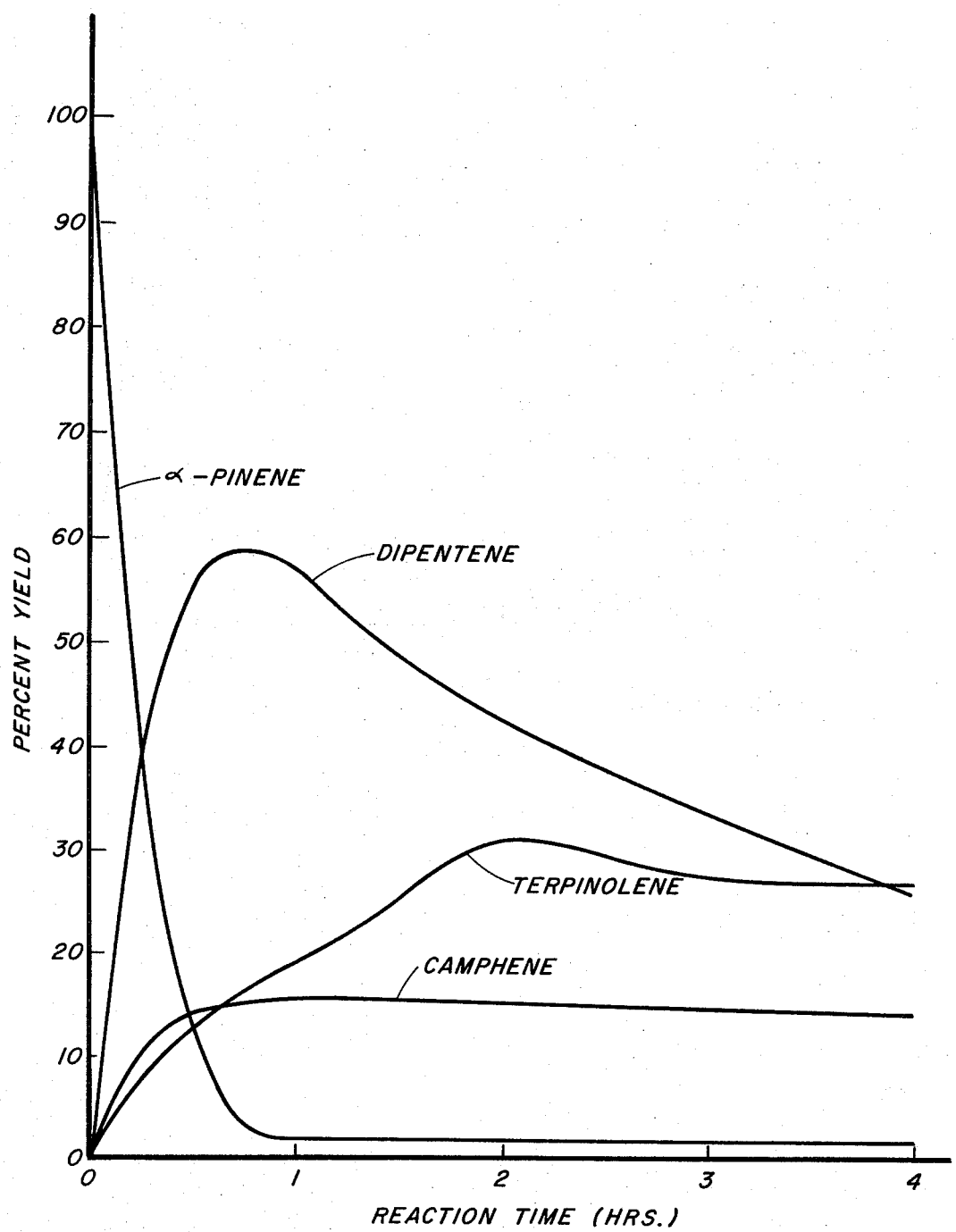

This example is further illustrated by FIG. 2 which illustrates that there is an optimum drying temperature for best product yield on an equal reaction time basis of two hours, which lies between about 300° and 350° C. This is also shown by Table I, although the rate of conversion for all of the runs of Table I is greatly superior to prior art processes.

EXAMPLE 6

Ten grams of calcined molecular sieve 13-X powder catalyst (Union Carbide Corp.) were slurried for about 10 minutes in 100 ml. of distilled water. The molecular sieve catalyst was recovered on a Buchner funnel and then dried at 325° C. for 17 hours. Samples of the catalyst were also prepared by repeating the extraction step three and six times prior to drying at 325° C. A control catalyst was prepared by wetting the calcined molecular sieve prior to drying.

The performance of the four catalysts samples was evaluated in batch isomerizations of α-pinene. Two hundred grams of α-pinene and two gm. of catalyst were charged to a 500-ml., three-neck flask fitted with a gas inlet tube, thermometer and reflux condenser. This amounted to 1% catalyst by weight of α-pinene. The flash was flushed with nitrogen and the α-pinene heated to reflux. Aliquots were removed during the reaction for gas chromatographic analyses. The results were as shown in Table II.

number of extractions as shown in the Table. It will be seen that miltiple extractions of the catalyst greatly increase the rate of conversion with only a negligible decrease in dipentene yield.

I claim:

1. A method for producing dipentene comprising isomerizing a pinene-containing feed at a temperature from about 150° to about 175° C. for from about 0.5 to 4 hours in the presence of from about 0.1 to about 5% based upon the weight of the feed of an activated molecular sieve zeolite catalyst of the 13X-type containing sodium ions, said catalyst being activated by water extraction comprising admixing and washing the catalyst from one to about ten times with from about one to about 15 times the volume of water based upon the volume of catalyst being activated, and drying at a temperature of from about 150° to about 600° C. until the moisture content of the activated catalyst is from about 2 to about 6%.

2. The method of claim 1 wherein the feed is selected from the group consisting of α-pinene, β-pinene, and turpentine.

3. A method for producing dipentene comprising isomerizing a terpene containing feed at a temperature from about 140° to about 200° C. for more than about 0.5 hours in the presence of less than about 10% based upon the weight of the feed of an activated zeolitic molecular sieve catalyst of the 13X-type said catalyst being activated by admixing and washing with greater than an equal volume percent of water until the catalyst is activated, and then subsequently dried.

4. The method of claim 3 wherein the predominant feed is selected from the group consisting of α-pinene, β-pinene, and turpentine.

5. The method of claim 3 wherein said catalyst is extracted from one to ten times with from about 2 to about 10 times the volume of water based upon the catalyst volume, and dried at a temperature from about 150° to about 600° C., until the moisture content of the catalyst is about 4%.

* * * * *